Jan. 19, 1965
A. ZINK
3,166,058
VALVE ACTUATING MECHANISM
Filed March 28, 1963
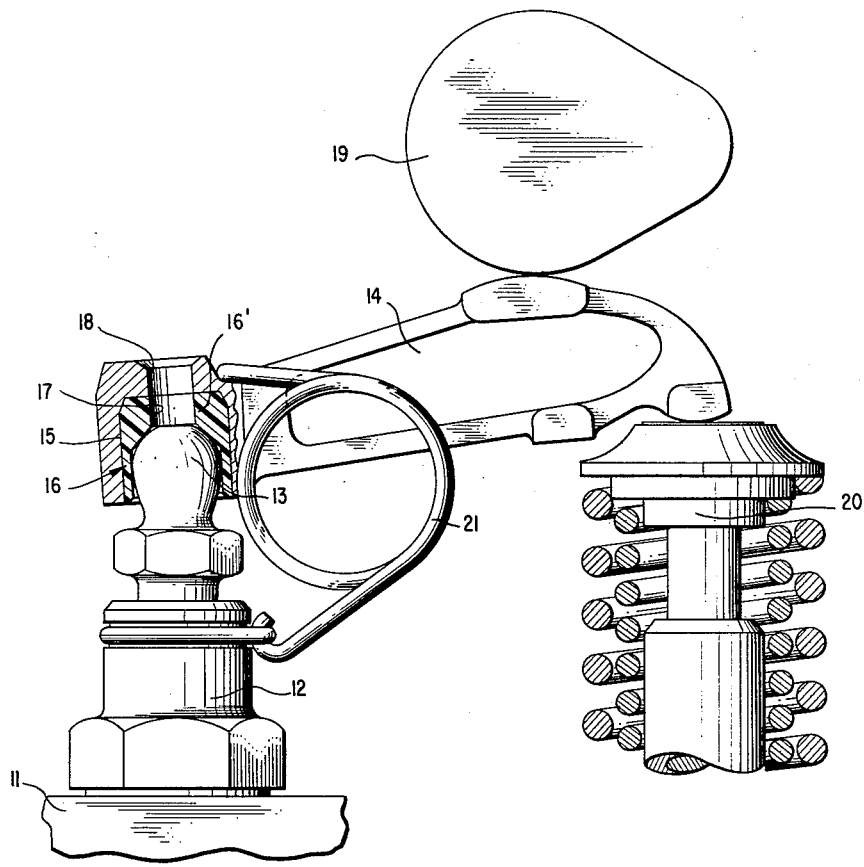
INVENTOR.
ANTON ZINK
BY Dickie & Craig
ATTORNEYS

United States Patent Office 3,166,058
Patented Jan. 19, 1965

3,166,058
VALVE ACTUATING MECHANISM
Anton Zink, Fellbach, Germany, assignor to Daimler-Benz Aktiengesellschaft, Stuttgart - Unterturkheim, Germany
Filed Mar. 28, 1963, Ser. No. 268,645
Claims priority, application Germany Mar. 30, 1962
1 Claim. (Cl. 123—90)

The present invention relates to a valve actuating mechanism, especially for internal combustion engines, provided with structural parts which are elastic within slight limits and are arranged between mutually movable surfaces or between bearing surfaces of individual actuating members.

With valve actuating mechanism for internal combustion engines it is known to provide elastic linings or separate structural parts between mutually movable surfaces of individual actuating members or between bearing surfaces, with the purpose to achieve a more noise-free operation of the actuating members and additionally to dampen any occurring shocks or impacts. Another reason for these prior art measures aims at eliminating the valve play.

The constructions known in the prior art, however, represent, now as before, measures insufficient in practice, particularly as regards the materials used therewith which are destroyed frequently already after short operating periods by reason of the extreme loads and stresses that occur during the operation of the valve actuating mechanism.

The present invention is concerned with the task to create a structurally simple solution and to solve the existing problem, especially from the material point of view, in a satisfactory manner.

It is proposed in accordance with the present invention to insert between mutually movable surfaces or between bearing surfaces of individual actuating members a layer or a separate structural part made of a wear- and abrasion-resistant, shock-proof and impact-resistant material that is elastic within very small limits, such as polyamide or nylon.

According to a further feature of the present invention, it is proposed to construct the layer, lining or separate structural part consisting of the synthetic plastic material mentioned hereinabove of cup-like shape, the bearing bottom of which is provided with an aperture or bore extending therethrough which continues in a further bore provided in and extending through the actuating member receiving the separate structural part. As a result of such an arrangement a direct lubricant supply to the bearing surfaces is made available in a simple manner.

In the application of the present invention to a valve actuating mechanism for internal combustion engines having a rocking lever constructed as drag lever and driven from the cam shaft, one end of which actuates the valve shaft and the other end of which is movably arranged on a bearing part secured to the engine housing, it is further proposed in accordance with the present invention to provide a preferably cylindrical aperture within the last-mentioned end of the drag lever into which is inserted in a form-locking manner the separate structural part made of the aforementioned synthetic plastic material of which the bearing surface of spherical shape rests on the bearing part secured to the engine and constructed as spherical or ball-shaped pin.

There is produced by the arrangement in accordance with the present invention in the form of a lining or structural part made of plastic material which has the technological properties required for the given application such as "Polyamide A," "Ultramid AK" or the like, an abrasion- and wear-resistant, impact-resistant, self-lubricating and noise-damping connection, which is elastic within minute limits, between two members of the valve actuating mechanism or a bearing support for one actuating member on or within another actuating member, whereby the entire valve actuating member is protected in a manner corresponding to the exigencies of the loads. A material particularly suitable with respect to the prevailing extreme load conditions is, for the first time, made utilizable by the present invention which material is also particularly insensitive to alternating stresses or cyclic loadings because, in addition to other advantages, it possesses also the property of regenerability in that even after many millions of alternating stresses it is able to always return after the deformation to its original shape.

Accordingly, it is an object of the present invention to provide a valve actuating mechanism, particularly for internal combustion engines, which eliminates by simple, inexpensive and reliable means the shortcomings and drawbacks encountered with the prior art constructions.

Another object of the present invention resides in the provision of a valve actuating mechanism which permits the use of a particularly suitable plastic material to achieve the aims of satisfactory operation without danger of premature wear due to the extreme stresses and loads that occur in such mechanisms.

Still another object of the present invention resides in the provision of a valve actuating mechanism which protects the overall valve mechanism, and makes possible a self-lubricating, noise-damping and impact- as well as wear-resistant connection between parts of the actuating mechanism without excessive expenditures.

These and other objects, features and advantages of the present invention will become more obvious from the following description when taken in connection with the accompanying drawing which shows, in the single figure thereof, a valve actuating mechanism, partially in cross section, in accordance with the present invention.

Referring now more particularly to the single figure of the drawing, reference numeral 11 designates therein the crank case housing of which only a portion is shown. A bearing support 12 having a ball-shaped bearing pin 13 is secured on the crank case housing 11. One end of the drag lever 14 is swingably or pivotably arranged on the bearing pin 13. For that purpose, a cylindrical aperture 15 is provided within the drag lever 14 into which is form-lockingly inserted a cup-shaped structural part generally designated by reference numeral 16 and made of plastic material such as polyamide. The bearing bottom 16' of the structural part 16 is provided with a bore 17 passing through the structural part 16 which bore 17 is continued by way of a further bore 18 extending through the drag lever 14. These two apertures or bores 17 and 18 effect in an advantageous manner that the lubricant which is sprayed about in the control space is able to reach the bearing surfaces between the spherically-shaped pin member 13 and the structural part 16.

The other end of the drag lever 14 which is actuated by the cam shaft 19, actuates in turn the valve shaft 20. Reference numeral 21 designates a hairpin spring which presses one end of the drag lever 14 against the bearing pin 13.

While I have shown and described one embodiment in accordance with the present invention, it is understood that the same is not limited thereto but is susceptible of numerous changes and modifications within the spirit and scope thereof as known to a person skilled in the art, and I therefore do not wish to be limited to the details shown and described herein but intend to cover all such changes and modifications as are encompassed by the scope of the appended claim.

I claim:

In a valve actuating mechanism for actuating a valve shaft of an internal combustion engine by means of a rocker arm driven by a cam shaft in which said rocker arm is constituted as a drag lever actuating with an end thereof said valve shaft, the other end of said lever being movably supported on an approximately ball-shaped bearing part secured to the housing of said engine, the improvement essentially consisting of means on said other end providing a noise-damping, wear-resistant, shock-proof, slightly resilient connection with said bearing part, said other end comprising a hollow cylindrical portion having an open end, wall means partially closing the other end of said hollow cylindrical portion, said wall means having an exteriorly opening central aperture of relatively large diameter extending vertically therethrough adapted to receive oil spray, a cup-shaped member composed of a synthetic plastic composed of polyamide engagingly disposed within said hollow cylindrical portion and in engagement with said approximately ball-shaped bearing portion, said cup-shaped member having an aperture extending through the bottom portion thereof, said bottom portion seating against said wall means, said last-named aperture being in registry with said first-named aperture and providing with the latter a lubricant-admitting passageway to the upper portion of said ball-shaped bearing portion.

References Cited in the file of this patent

UNITED STATES PATENTS

| | | |
|---|---|---|
| 1,548,401 | Wood | Aug. 4, 1925 |
| 2,865,691 | Muller | Dec. 23, 1958 |
| 2,970,869 | Thomas | Feb. 7, 1961 |
| 3,038,459 | Schmid | June 12, 1962 |

FOREIGN PATENTS

| | | |
|---|---|---|
| 875,350 | Great Britain | Aug. 16, 1961 |

(Corresponding U.S. 3,002,507, Oct. 3, 1961)